United States Patent
Wright

(10) Patent No.: US 7,628,421 B2
(45) Date of Patent: Dec. 8, 2009

(54) EJECTION CONTROL MECHANISM FOR RAIL MOUNT AIRBAG

(75) Inventor: Sean Anthony Wright, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 286 days.

(21) Appl. No.: 11/565,278

(22) Filed: Nov. 30, 2006

(65) Prior Publication Data

US 2007/0182143 A1  Aug. 9, 2007

Related U.S. Application Data

(60) Provisional application No. 60/771,203, filed on Feb. 7, 2006.

(51) Int. Cl.
 *B60R 21/13* (2006.01)
(52) U.S. Cl. .................... 280/730.2; 280/743.2
(58) Field of Classification Search ............. 280/743.2, 280/730.2, 749
 See application file for complete search history.

(56) References Cited

U.S. PATENT DOCUMENTS

| | | | |
|---|---|---|---|
| 6,296,276 B1 * | 10/2001 | Ritter | 280/743.2 |
| 6,347,807 B1 * | 2/2002 | Schink et al. | 280/730.2 |
| 6,422,593 B1 * | 7/2002 | Ryan | 280/730.2 |
| 6,464,250 B1 * | 10/2002 | Faigle et al. | 280/730.2 |
| 6,505,853 B2 * | 1/2003 | Brannon et al. | 280/730.2 |
| 6,695,347 B2 * | 2/2004 | Sonnenberg et al. | 280/743.2 |
| 6,802,530 B2 * | 10/2004 | Wipasuramonton et al. | 280/730.2 |
| 6,991,255 B2 * | 1/2006 | Henderson et al. | 280/730.2 |
| 7,125,038 B2 * | 10/2006 | Gammill | 280/728.2 |
| 7,322,600 B2 * | 1/2008 | Inoue et al. | 280/730.2 |
| 2005/0098985 A1 * | 5/2005 | Sullivan et al. | 280/729 |
| 2006/0232054 A1 * | 10/2006 | Schlosser et al. | 280/743.2 |
| 2006/0237950 A1 * | 10/2006 | Worrell et al. | 280/728.2 |
| 2007/0052212 A1 * | 3/2007 | Powals | 280/729 |
| 2007/0200329 A1 * | 8/2007 | Ma | 280/743.1 |

* cited by examiner

*Primary Examiner*—Paul N Dickson
*Assistant Examiner*—Nicole Verley
(74) *Attorney, Agent, or Firm*—Gifford, Krass, Sprinkle, Anderson & Citkowski, P.C.

(57) ABSTRACT

An ejection control mechanism for a rail mount airbag is provided. The ejection control mechanism is comprised of an elongated strap attached to the rearwardmost cell of a side impact airbag. When the cell is inflated, the strap applies a tension to the cell in an upward and rearward direction and thereby assists the airbag in providing complete coverage of the motor vehicle side windows. One embodiment of the present invention is comprised of the strap being attached to the rearwardmost cell of the rail mounted airbag, whereas a second embodiment is comprised of the strap being attached to the rearwardmost cell and the motor vehicle frame.

3 Claims, 3 Drawing Sheets

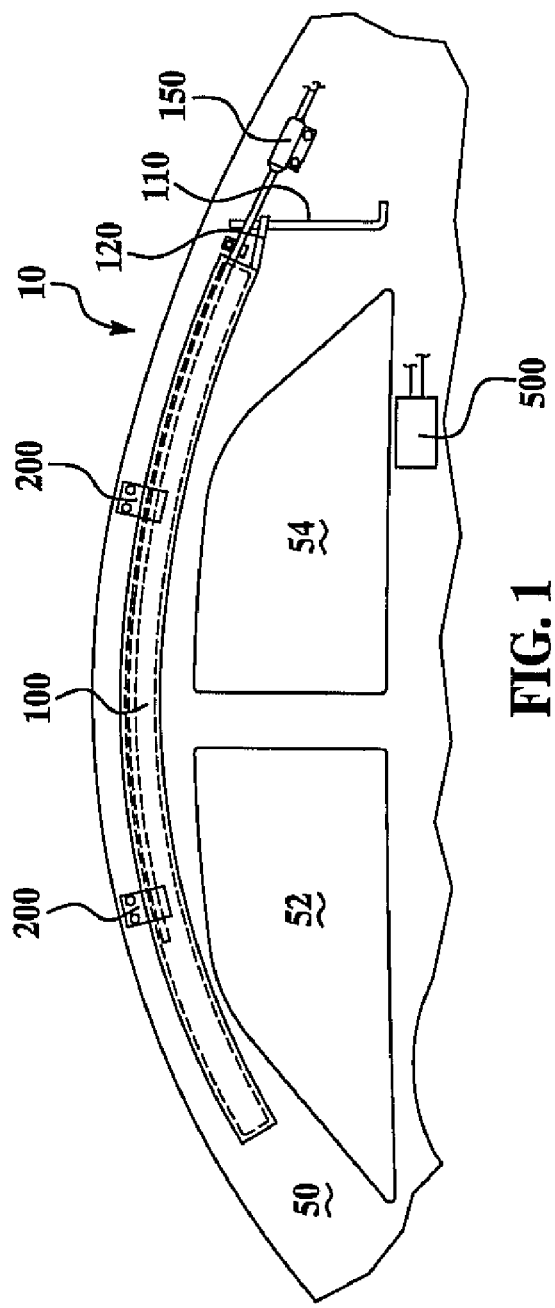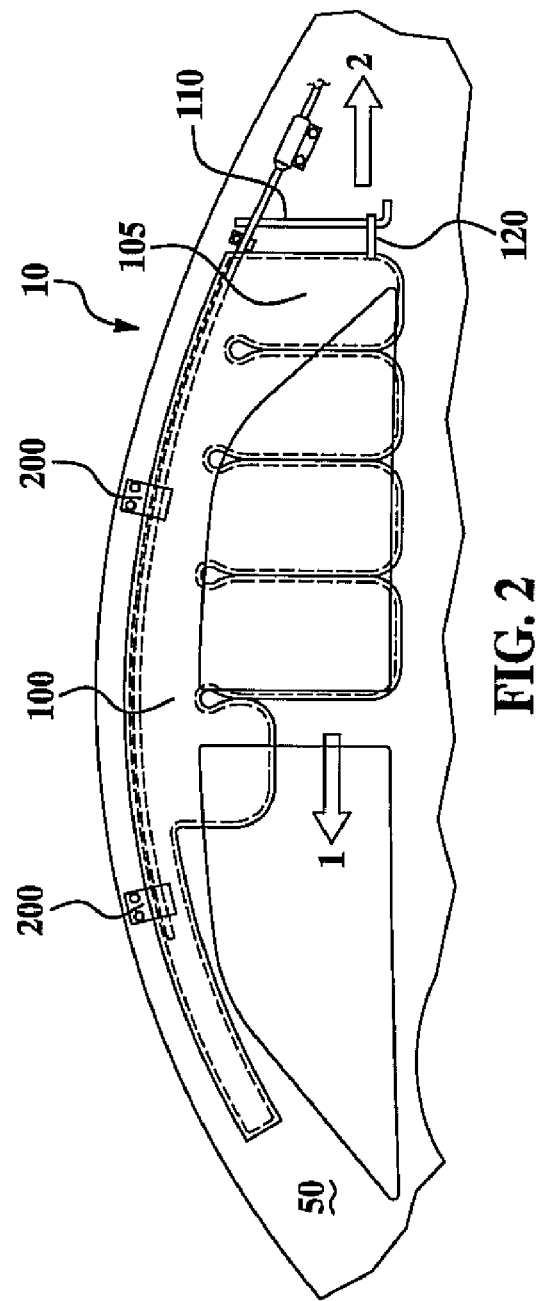

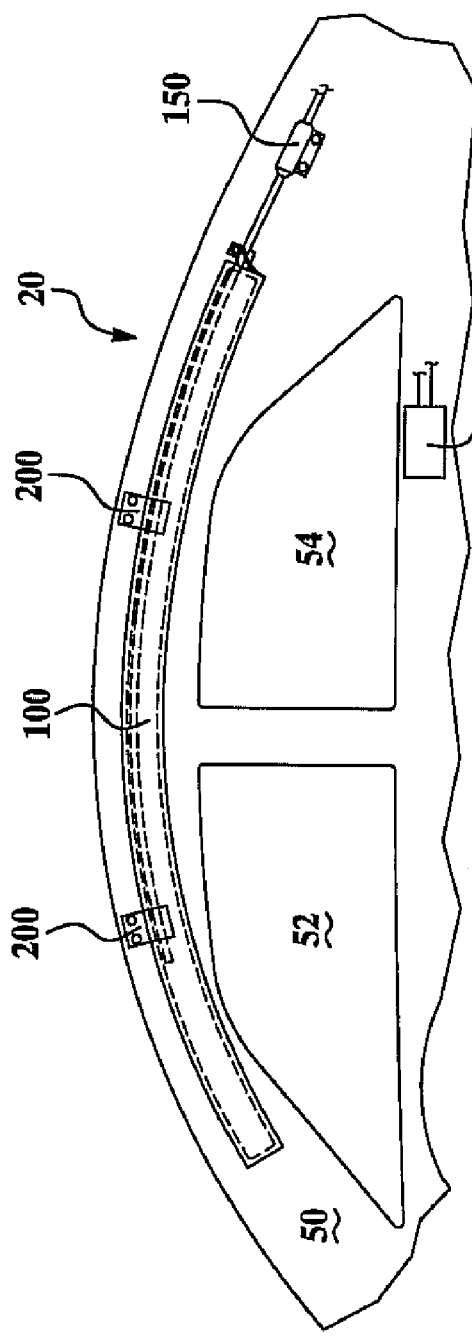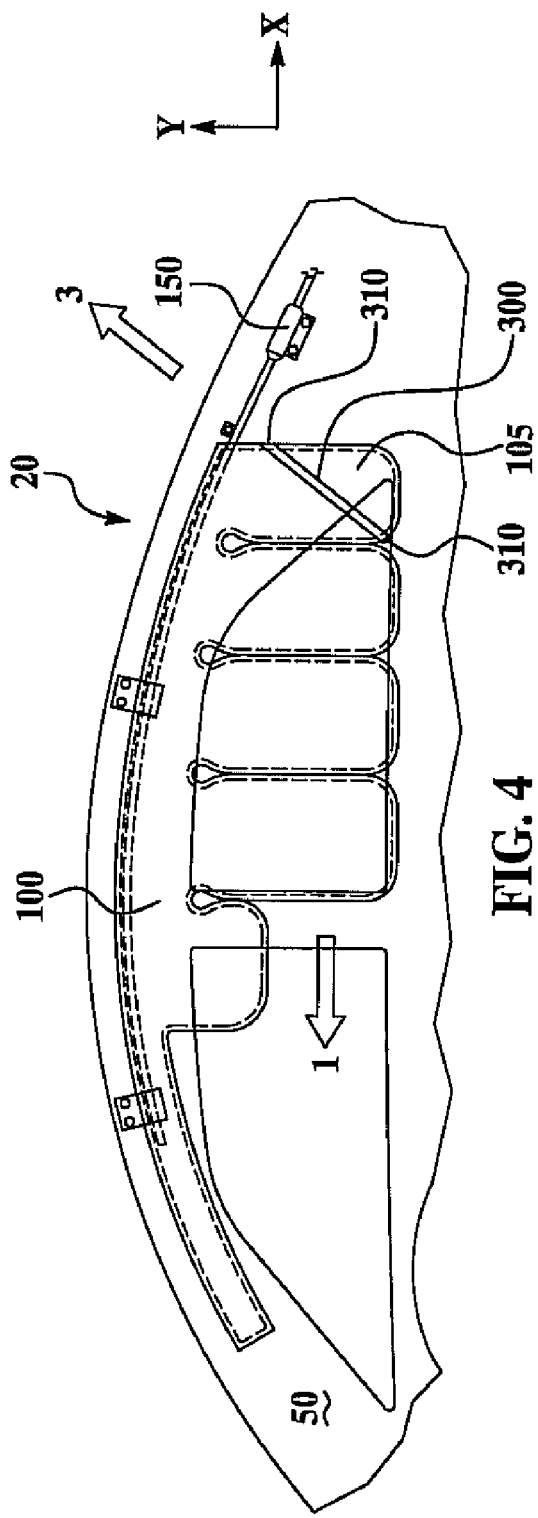

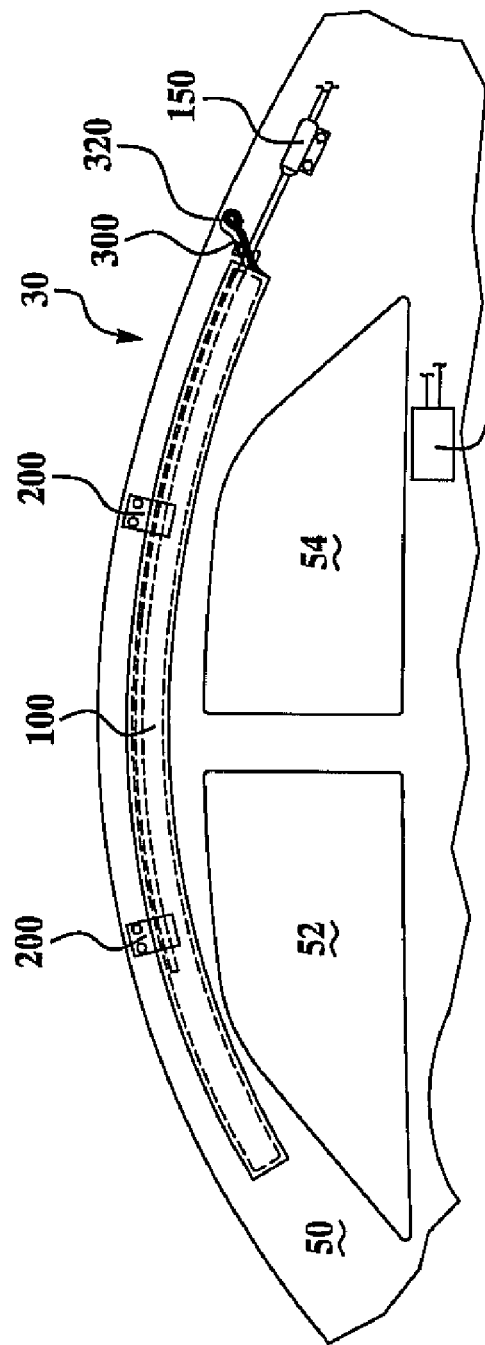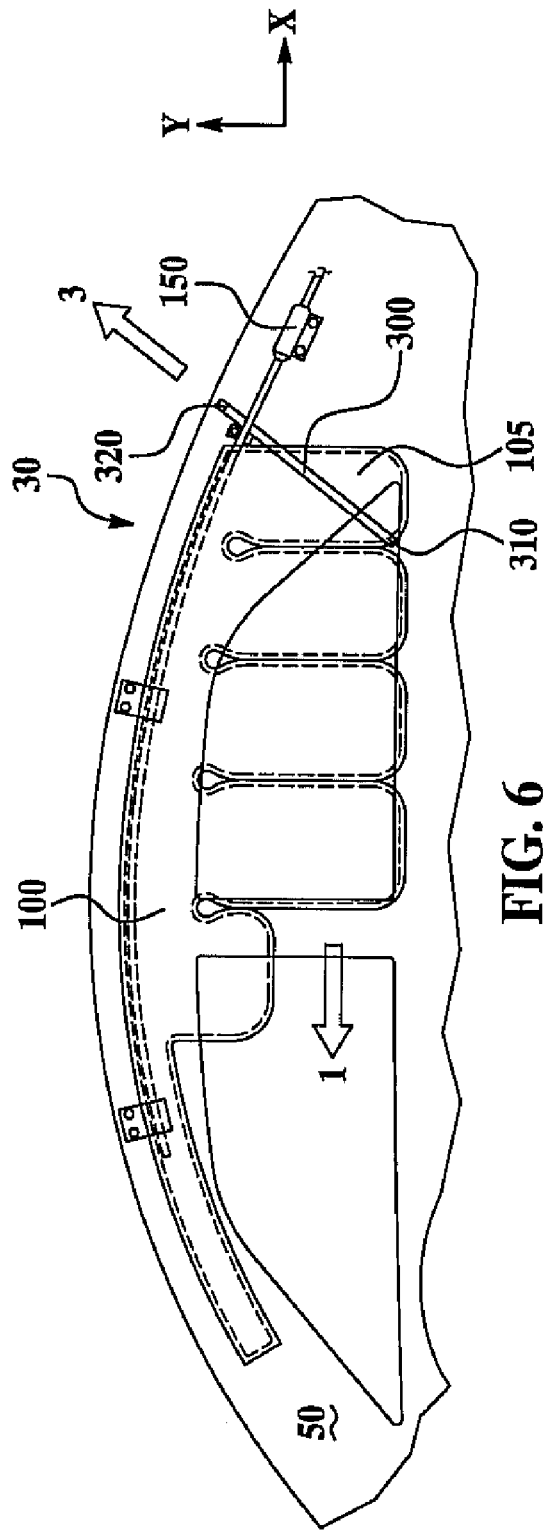

EJECTION CONTROL MECHANISM FOR RAIL MOUNT AIRBAG

RELATED APPLICATION

This application claims priority of U.S. Provisional Patent Application Ser. No. 60/771,203 filed Feb. 7, 2006, which is incorporated herein by reference.

FIELD OF THE INVENTION

The present invention relates to an ejection control mechanism for a rail mounted airbag.

BACKGROUND OF THE INVENTION

Many modern automotive vehicles include side airbags which, upon inflation, protect the vehicle occupants from injury during a side impact or rollover. These side airbags may be either of the roll-up or accordion-style configuration and are mounted to a rail above the vehicle side windows. Upon inflation, the airbag ideally extends downward from the rail and entirely covers the side windows. For example, with reference to FIG. 1, a rail mounted airbag 100 is mounted to a vehicle frame 50 using airbag mounts 200. Upon sensing a side impact or rollover of the vehicle, deployment switch 500 activates airbag inflation device 150. As shown in FIG. 2, the rail mount airbag 100 inflates a series of cells in a first direction 1.

In order to prevent any portion of airbag 100 from exiting vehicle front side window 52 and/or vehicle rear side window 54, a guide bar 110 and tether 120 are employed. The tether 120 slides along the guide bar 110 from the guide bar's top to its bottom. In doing so, the tether 120 provides tension on the rearwardmost cell 105 of the airbag 100 in a second direction 2 to ensure that airbag 100 entirely covers the side windows 52 and 54.

One disadvantage of these previously known airbag constructions, however, is that it is difficult to design the tether 120 and guide bar 110 such that the tether 120 freely slides along the guide bar 110 upon airbag inflation. Consequently, in the event that the tether 120 does not freely slide along the guide bar 110, incomplete coverage of the window 54 and/or window 52 by the airbag 100 can result. In the event complete coverage of the windows does not occur, objects from outside the vehicle can enter the vehicle and harm the driver or passenger and/or objects from within the vehicle can be thrown outside. Therefore, it would be advantageous to have an ejection control mechanism that ensured complete coverage of the side windows of a motor vehicle.

SUMMARY OF THE PRESENT INVENTION

An ejection control mechanism for a rail mount airbag is provided. The ejection control mechanism is comprised of an elongated strap attached to the rearwardmost cell of a side impact airbag. When the cell is inflated, the strap applies a tension to the cell in an upward and rearward direction and thereby assists the airbag in providing complete coverage of the motor vehicle side windows. One embodiment of the present invention is comprised of the strap being attached to the rearwardmost cell of the rail mounted airbag, whereas a second embodiment is comprised of the strap being attached to the rearwardmost cell and the motor vehicle frame.

BRIEF DESCRIPTION OF THE DRAWINGS

FIG. 1 is a guide bar and tether ejection control mechanism for a rail mount airbag;

FIG. 2 is a guide bar and tether ejection control mechanism for a rail mount airbag during deployment;

FIG. 3 is a first embodiment of an inventive ejection control mechanism for a rail mount airbag;

FIG. 4 is a first embodiment of an inventive ejection control mechanism for a rail mount airbag during deployment;

FIG. 5 is a second embodiment of an inventive ejection control mechanism for a rail mount airbag; and FIG. 6 is a second embodiment of an inventive ejection control mechanism for a rail mount airbag during deployment.

DETAILED DESCRIPTION OF THE PRESENT INVENTION

The present invention employs the use of a flexible strap fixedly attached to the rearwardmost cell of a side airbag to ensure the airbag entirely covers front and rear side windows. Referring to FIG. 3, a rail mount airbag 100 is secured to a motor vehicle frame 50 using mounting brackets 200. Upon sensing a side impact or rollover of a motor vehicle, sensing switch 500 activates airbag inflation device 150 for the purpose of inflating airbag 100.

In contrast to the guide bar 110 and tether 120 shown in FIGS. 1 and 2, a first embodiment of an ejection control mechanism shown generally at 20 is comprised of a flexible strap 300 that is fixedly attached to end cell 105 of rail mount airbag 100. Flexible strap 300 has a first end 310 and a second end 320. Upon deployment of airbag 100 a plurality of cells are inflated in a first direction 1. The first end 310 and second end 320 of flexible strap 300 are located on rear cell 105 such that strap 300 travels or lies along an upward and rearward direction when airbag cell 105 is inflated. For the present invention, upward is defined as a direction traveling from the bottom of the vehicle to the top of the vehicle and rearward is defined traveling from the front of the vehicle towards the back of the vehicle. Furthermore, first direction 1 points to the front of the vehicle whereas second direction 2 points to the back of the vehicle. Attachment of the strap 300 to cell 105 in this manner affords a tension applied to said cell in an X and Y direction and a resultant force in a third direction 3. By affording a resultant force in a third direction 3, the end cell 105 and remaining cells of airbag 100 are assisted in covering the entire side rear window 54 and side front window 52. It is appreciated that FIGS. 3 and 4 teach that the rear cell 105 has an outer seam facing the rearward direction and an inner seam facing the forward direction. In addition, the inner seam separates the rear cell 105 from the remaining cells and the strap 300 extends only across the rear cell 105. As such, a single strap extending a short distance provides an ejection control mechanism.

Flexible strap 300 is manufactured from any material known to those skilled in the art, illustratively including cloth, plastic, metal, and combinations thereof. Furthermore, the flexible strap 300 is fixedly attached to end cell 105 using an attachment means which is comprised of adhesives, sewing, buttons, snaps, hook-and-loop fasteners and combinations thereof. The flexible strap 300 is typically attached to end cell 105 along its entire length. In the alternative, flexible strap 300 is not attached to end cell 105 along its entire length.

Turning to FIGS. 5 and 6, a second embodiment of an inventive ejection control mechanism for a rail mount airbag is shown generally at 30. Employing the same airbag 100, airbag inflation device 150 and mounting brackets 200, the side airbag system is mounted to vehicle frame 50. However in the second embodiment, second end 320 of flexible strap 300 is fixedly attached to vehicle frame 50. Upon deployment of airbag 100, inflation of a plurality of cells in a first direction 1 occurs. Flexible strap 300 is fixedly attached to end cell 105. Similar to the first embodiment, flexible strap 300 affords for tension upon end cell 105 in an X and Y direction and a resultant force in a third direction 3. The resultant force on cell 105 in the third direction 3 assists side airbag 100 in covering the entire rear side window 54 and front side window 52. In this manner, prevention of objects entering into or leaving the vehicle is afforded.

From the foregoing, it can be seen that the present invention provides a simple and yet effective ejection control mechanism for a rail mount airbag. Having described the invention, however, many modifications thereto will become apparent to those skilled in the art to which it pertains without deviation from the spirit of the invention as defined by the scope of the appended claims.

The invention claimed is:

1. An ejection control mechanism for a rail mount airbag using a single strap extending a short distance, said ejection control mechanism comprising:

an airbag having a plurality of cells, one of said plurality of cells being an end cell, said end cell having an outer seam and an inner seam, said inner seam separating said end cell from remaining cells of said plurality of cells;

an elongated flexible strap, said strap fixedly attached to said outer seam and extending downwardly across said end cell to said inner seam, said strap also fixedly attached to said inner seam;

wherein said elongated strap extends only across said end cell, for the purpose of providing tension to said end cell during deployment of said airbag using a single strap extending a short distance.

2. The invention of claim 1, wherein said strap is fixedly attached to said end cell using an attachment means, said attachment means being selected from the group consisting of adhesive, sewing, buttons, snaps, hook-and-loop fasteners and combinations thereof.

3. The invention of claim 1, wherein said strap extends across said end cell in an upwardly and rearwardly direction.

* * * * *

UNITED STATES PATENT AND TRADEMARK OFFICE
CERTIFICATE OF CORRECTION

| | |
|---|---|
| PATENT NO. | : 7,628,421 B2 |
| APPLICATION NO. | : 11/565278 |
| DATED | : December 8, 2009 |
| INVENTOR(S) | : Sean Anthony Wright |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 294 days.

Signed and Sealed this

Twenty-first Day of December, 2010

David J. Kappos
*Director of the United States Patent and Trademark Office*